United States Patent
Chandra et al.

(10) Patent No.: US 8,914,329 B1
(45) Date of Patent: Dec. 16, 2014

(54) AUTOMATED TIME-BASED TESTING METHOD FOR DISTRIBUTED SYSTEM

(71) Applicant: EMC Corporation, Hopkinton, MA (US)

(72) Inventors: Krishna Reddy Chandra, Bangalore (IN); Kiran Kumar Dudala, Chittoor (IN); Subramanian Nallasivam, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 169 days.

(21) Appl. No.: 13/726,351

(22) Filed: Dec. 24, 2012

(51) Int. Cl.
*G06F 17/30* (2006.01)

(52) U.S. Cl.
CPC .............................. *G06F 17/30289* (2013.01)
USPC ........................................................ 707/654

(58) Field of Classification Search
USPC ............................................... 707/654, 674
See application file for complete search history.

(56) References Cited

U.S. PATENT DOCUMENTS

| | | | | |
|---|---|---|---|---|
| 8,185,502 B2 * | 5/2012 | Irisawa et al. | ................. | 707/654 |
| 8,347,048 B2 * | 1/2013 | Palagummi | ................... | 711/161 |
| 2003/0005120 A1 * | 1/2003 | Mutalik et al. | ................ | 709/225 |
| 2004/0193953 A1 * | 9/2004 | Callahan et al. | ................ | 714/15 |
| 2004/0205206 A1 * | 10/2004 | Naik et al. | ..................... | 709/230 |
| 2005/0154734 A1 * | 7/2005 | Zucchini | ........................ | 707/10 |
| 2005/0278397 A1 * | 12/2005 | Clark | ............................ | 707/204 |
| 2007/0288534 A1 * | 12/2007 | Zak et al. | ...................... | 707/204 |
| 2008/0154979 A1 * | 6/2008 | Saitoh et al. | .................. | 707/202 |
| 2008/0229142 A1 * | 9/2008 | Anand et al. | ....................... | 714/4 |
| 2009/0125692 A1 * | 5/2009 | Yamamoto et al. | .......... | 711/162 |
| 2012/0072582 A1 * | 3/2012 | Kline | ............................ | 709/224 |
| 2013/0139130 A1 * | 5/2013 | Anjan et al. | .................. | 717/131 |

* cited by examiner

*Primary Examiner* — Cam-Linh Nguyen
(74) *Attorney, Agent, or Firm* — Staniford Tomita LLP

(57) ABSTRACT

This disclosure relates to a method, article of manufacture, and apparatus for automated time-based testing of a distributed system. In some embodiments, this includes setting a backup schedule for a backup of data on a client using a server scheduler on a server, setting a recover schedule using a client scheduler on the client, wherein the client includes a data simulation for generating the data and a repository, wherein the repository includes attributes of the data and a metadata of the backup, starting the data simulation on the client, according to the backup schedule, from the server, triggering a set of backup scripts to perform the backup of the data generated by the data simulation, and according to the recover schedule, triggering a set of recover scripts to perform a recover of the data on the client.

17 Claims, 3 Drawing Sheets

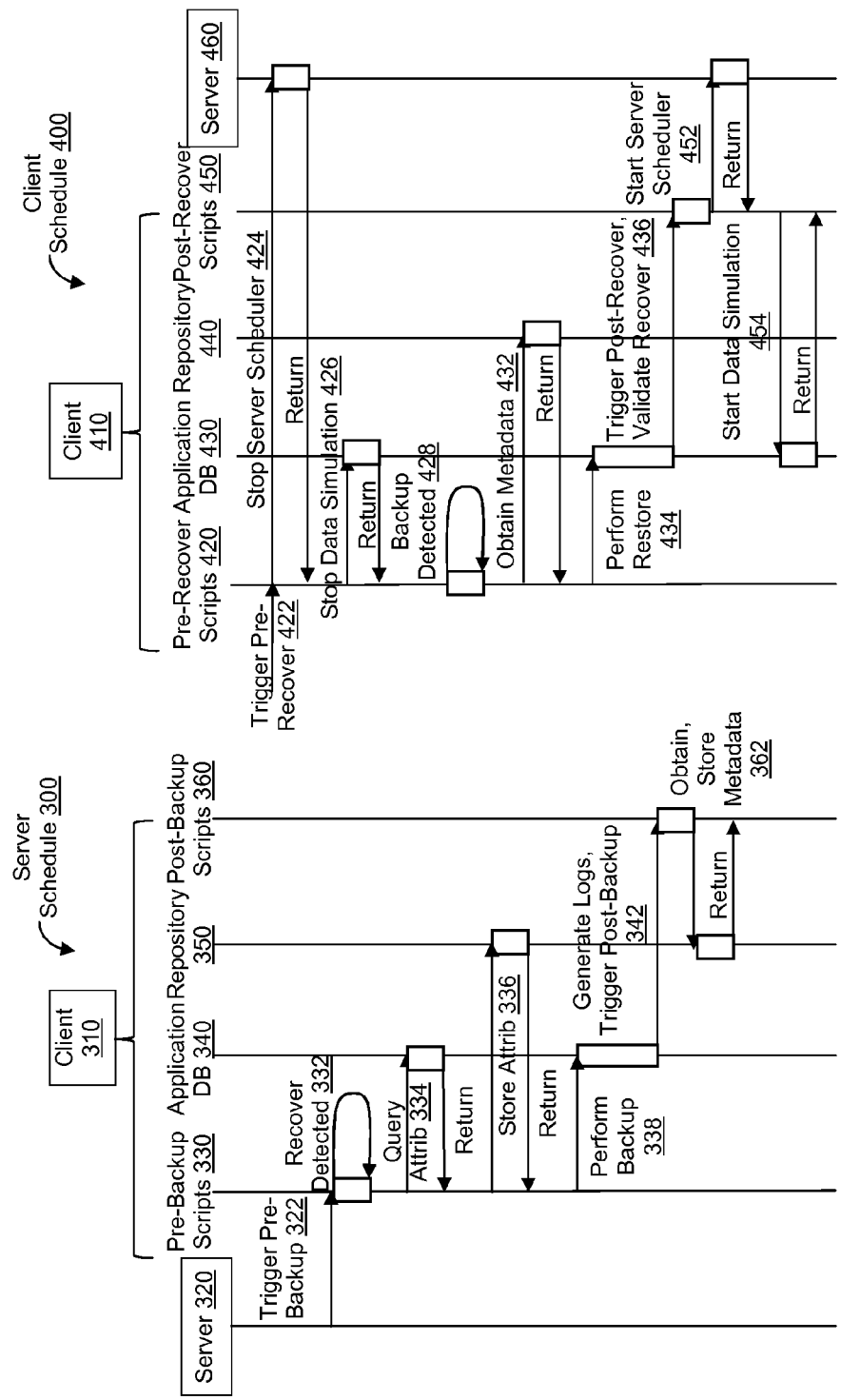

AUTOMATED TIME-BASED TESTING METHOD FOR DISTRIBUTED SYSTEM

FIELD

The present invention relates generally to computer systems and specifically to systems and methods of testing computer systems.

BACKGROUND

Traditional testing methods often involve creating inputs to a system and verifying the outputs against the expected correct response. To date, inputs have been supplied and outputs have been verified either by manual or automated test execution. Manual execution is time and labor intensive. Thus, automation is important to achieve economical test coverage.

Automation using scripts enables simulating manual activities with no or minimal human intervention. However, in a system where a set of inputs depend on the timing and status of a set of outputs, simple scripts may be inadequate. For example, multiple features of a product may need to be tested consecutively. The execution of a first feature may depend on the completion of a second feature. When consecutive testing of such features is performed in order to determine the load and reliability of the product, simple scripts may not be able to detect the status change of each feature test execution and analyze the outputs in time. Thus, monitoring the progress and validating the outputs may present a challenge. This challenge may be particularly acute in a distributed system, where different features of a product may be deployed across multiple hosts. In order to thoroughly test the product, the start and end of different test scripts may require careful planning and coordination.

There is a need, therefore, for an improved automated time-based testing method for distributed systems.

BRIEF DESCRIPTION OF THE DRAWINGS

The present invention will be readily understood by the following detailed description in conjunction with the accompanying drawings, wherein like reference numerals designate like structural elements, and in which:

FIG. 3 is a timing diagram illustrating a method to perform a backup according to a server schedule in an automated time-based testing of a distributed system in accordance with some embodiments.

FIG. 4 is a timing diagram illustrating a method to perform a recovery according to a client schedule in an automated time-based testing of a backup and recovery system in accordance with some embodiments.

DETAILED DESCRIPTION

Figure 1:
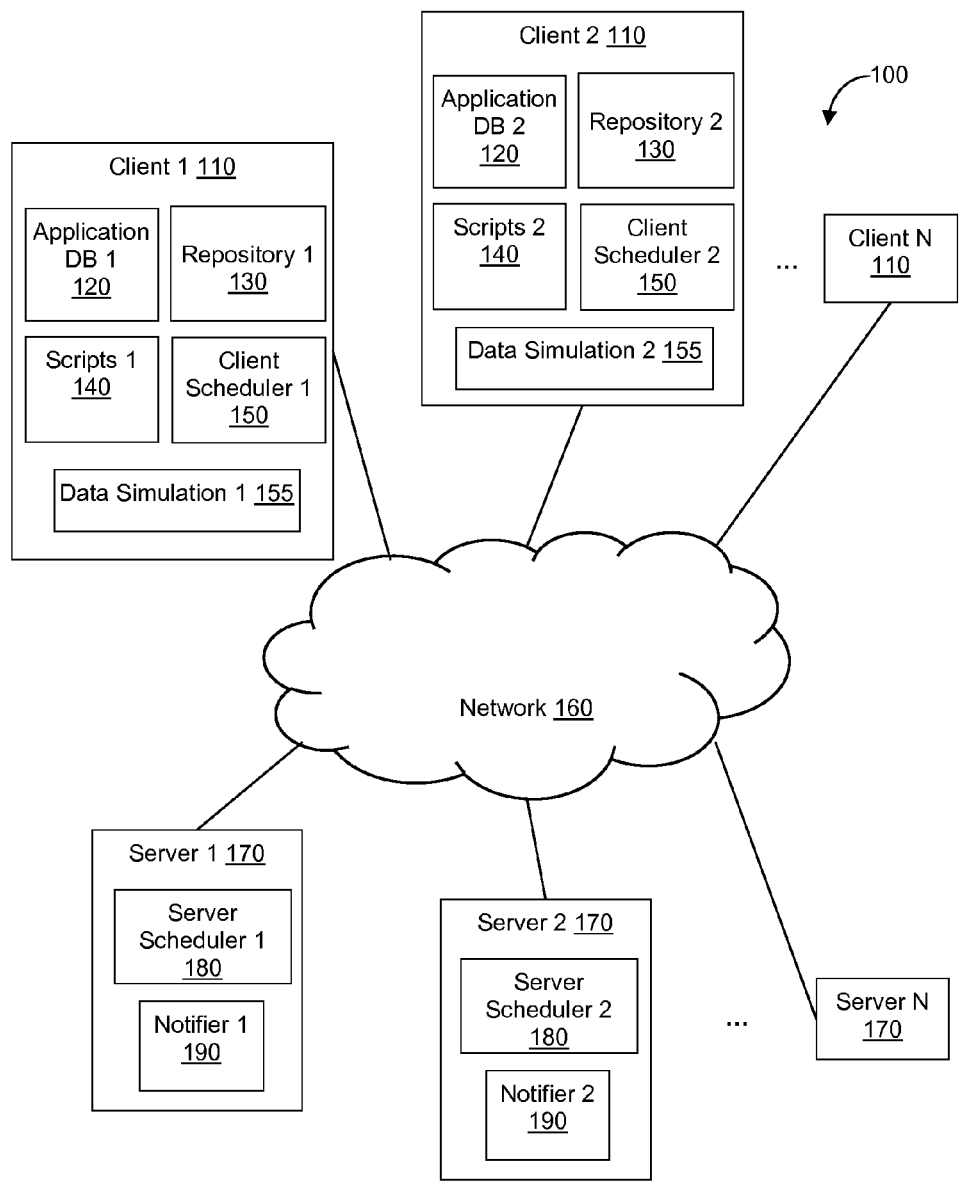
FIG. 1 is a diagram of a distributed system configured to implement an automated time-based testing method in accordance with some embodiments.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

Disclosed herein are methods and systems of automated testing. Some embodiments of the invention involve automated testing methods for backup and recovery software in a distributed system; however, those skilled in the art will appreciate that the invention is not limited thereto.

FIG. 1 illustrates an environment where automated time-based testing methods and systems may be implemented, in accordance with some embodiments. Distributed System 100 may include Clients 110 and Servers 170 connected by Network 160. Client 110 may represent a system, such as a laptop, a desktop, a mobile device, or a virtual machine, etc., used to generate and send requests to applications executing in Servers 170. Server 170 may represent a web and/or application server, which executes applications capable of performing tasks requested by users using Clients 110. The applications may perform tasks on data maintained internally or externally and send the result to Clients 110. It should be noted that different modules of the same application may be deployed and executed on different systems within Distributed System 100. As illustrated by FIG. 1, there may be any number of clients and any number of servers.

Network 160 may provide connectivity to the various systems of FIG. 1 and may be implemented using protocols such as Transmission Control Protocol (TCP) and/or Internet Protocol (IP), well known in the relevant arts. Network 160 may also be implemented to provide support for various storage architectures such as storage area network (SAN), Network-attached Storage (NAS), Direct-attached Storage (DAS), etc.

In some embodiments, Clients 110 may include various components, such as Application Database 120, Repository 130, a collection of Scripts 140, Client Scheduler 150, and Data Simulation 155. Data Simulation 155 may be one or more modules for generating simulated production environment data. The data generated by Data Simulation 155 may be stored in Application Database 120 for testing. For example, Data Simulation 155 may be configured to simulate sending emails between simulated user accounts. The emails generated by Data Simulation 155 may be stored in Application Database 120 for testing. In some embodiments, Application Database 120 may be a collection of files on Client 110.

The attributes associated with Application Database 120 may be obtained by querying Application Database 120, and the obtained attributed may be stored in Repository 130. Such attributes may include the name, size, and/or content of the data generated by Data Simulation 155, among others. For example, when Application Database 120 is a collection of files on Client 110, a list of subfolders and files may be obtained by querying Application Database 120 and stored in Repository 130. In another example, when Application Database 120 is an email database, the attributes of the email database, such as the size of the database, the number of users, and the number of emails in the email database, among others, may be obtained by querying Application Database 120 and stored in Repository 130.

Prior to the automated time-based testing of Distributed System 100, Client Scheduler 150 may be configured to trigger the execution of one or more Scripts 140 according to a schedule. The schedule may include the execution time and intervals of the one or more Scripts 140. Similarly, Server Scheduler 180 on Server 170 may be configured prior to the automated time-based testing of Distributed System 100 in order to trigger the execution of one or more Scripts 140 according to a separate schedule.

For example, in case the automated time-based testing is performed for a backup and recovery product deployed on Distributed System 100, Client Scheduler 150 may be configured to trigger the execution of one or more recovery scripts at certain time and intervals, and Server Scheduler 180 may be configured to trigger the execution of one or more backup scripts at certain time and intervals. In some embodiments, Client Scheduler 150 may be an OS scheduler, and Server Scheduler 180 may be either an OS scheduler or an in-product scheduler.

Once the initial configuration and initialization of Client Scheduler 150 and Server Scheduler 180 is complete, automated time-based testing may begin. During the automated time-based testing, the collection of Scripts 140 may perform tasks according to schedules specified by the schedulers. Coordination such as status checking of the completion of each script may be conducted during the execution of Scripts 140. The status may be stored in Repository 130 for validation during and after the automated testing. Notifier 190 on Server 170 may record log entries as well send out notifications of the status.

Figure 2:
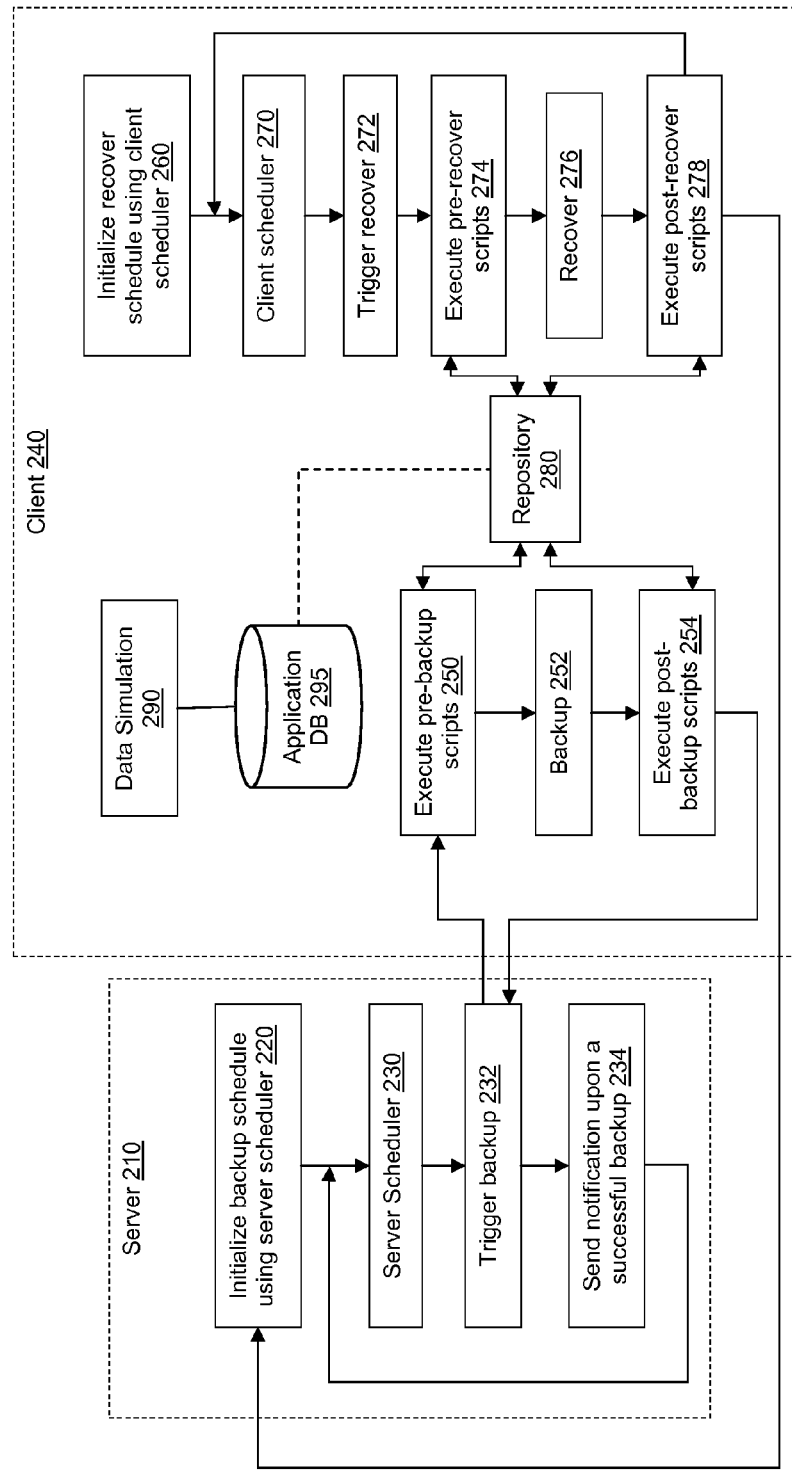
FIG. 2 is a diagram of an automated time-based testing method in a backup and recovery system in accordance with some embodiments.

FIG. 2 is a block diagram illustrating the interaction between Server 210 and Client 240 during an automated time-based testing of a distributed backup and recovery system, in accordance with some embodiments. On Server 210, a backup schedule may be set using Sever Scheduler 230 in step 220. After the initial configuration, when it is time to perform a backup according to the backup schedule, Server Scheduler 230 may trigger a backup of Application Database 295 in step 232. The triggering of the backup may be performed through the triggering of a set of backup scripts. Upon a successful backup, notifications may be sent through Notifier 190 in step 234. The automated backup may be performed again after an interval according to the backup schedule configured through Server Scheduler 230.

On Client 240 a recover schedule may be set using Client Scheduler 270 in step 260. This may be substantially similar to the initial configuration on Server 210. After the initial setup, when it is time to perform a recover according the recover schedule, Client Scheduler 270 may trigger a recover of backup data in step 272. The triggering of the recovery may be performed through the triggering of a set of recover scripts. Upon a successful recovery, in some embodiments, notifications may be sent. The automated recovery may be performed again after an interval according to the schedule configure in Client Scheduler 270. The coordination between the automated time-based backup and recovery testing may be conducted through the execution of Scripts 140.

During the automated time-based testing, Data Simulation 290 on Client 240 may be used to generate application data and store the generated data in Application DB 295. The data stored in Application DB 295 may then be used for the automated time-based testing of backup and recover. The attributes of data for backup and recovery testing may be stored in Repository 280. Once testing starts, Data Simulation 290 may continuously generate data, and the automated time-based backup and recovery testing may be triggered according to the schedules set by Server Scheduler 230 and Client Scheduler 270.

In some embodiments, when backup is triggered in step 232, one or more Scripts 140 on Client 240 may be executed. Such scripts may include pre-backup and post-backup scripts, among others. Pre-backup scripts may first check if any recovery process is running on Client 240. If any recover is detected running on Client 240, pre-backup scripts may delay the start of Backup 252 until the completion of the recovery process. The pre-backup scripts may also query Application database 295 to obtain attributes of backup data and store the attributes in Repository 280. Such attributes may include the name, size, content, and/or structure of data stored in Application Database 295, among others.

In the exemplary system, as illustrated in FIG. 2, Client Scheduler 270 and Server Scheduler 230 may operate independently. The coordination of backup and recover feature testing in the distributed system is conducted in scripts. In some embodiments, the pre-backup scripts may poll Client 240 at an interval to determine if any recovery process is still running. The determination may be conducted by querying Client 240 and detecting the presence of any recover process running on Client 240. The periodical monitoring and status check may continue until Client 240 no longer has any recovery process running. Once the pre-backup scripts determine that Client 240 is not running any recovery process, Backup 252 may start.

Upon completion of Backup 252, post-backup scripts may be triggered in step 254. Post-backup scripts may obtain metadata about Backup 252, such as the type of the backup (i.e. incremental backup or full backup etc.), an identifier of the backup data as a backup reference, timestamps associated with the backup (i.e. backup savetime and backup completion time etc.), and the backup status, among others. In some embodiments, the metadata may be obtained from backup logs. The metadata obtained may be stored in Repository 280 for validation during recover.

In some embodiments, when recover is triggered in step 272 according to the recover schedule set by Client Scheduler 270, one or more Scripts 140 on Client 240 may be executed. Such scripts may include pre-recover and post-recover scripts, among others. During recover, pre-recover scripts may be executed in step 274. Pre-recover scripts may first stop Server Scheduler 230 so that no backup operation may be triggered during recover process. By stopping Server Scheduler 230, the possibility of backup and recovery running simultaneously may be eliminated. For example, during backup operation, even if Client Scheduler 270 attempts to trigger recover in step 272 by executing pre-recover scripts in step 274, the pre-recover scripts may detect the running of the backup and delay the start of Recover 276. Alternatively or additionally, instead of stopping Server Scheduler 230, pre-backup scripts may be configured to first stop Client Scheduler 270 so that the possibility of backup and recovery running simultaneously may be eliminated.

In addition to stopping Server Scheduler 230 in pre-recover scripts, data generation by Data Simulation 290 of the automated time-based testing may be stopped to simulate real time scenarios in production systems. In many production systems, users may start a recover to restore a corrupted or crashed Application Database 295. When Application Database 295 is corrupted or crashed, no or limited data operations on Application Database 295 may be performed. After stopping both Server Scheduler 230 and Data Simulation 290, pre-recover scripts may then check if any backup process is running on Client 240. If a backup is detected, pre-recover scripts may delay the start of Recover 276 until the completion of the backup process. In some embodiments, similar to the pre-backup scripts, the pre-recover scripts may poll at an interval to determine if the backup process is complete. The determination may be conducted by detecting the presence of any backup process running on Client 240. The periodical monitoring and status check may continue until Client 240 no longer has any backup process running. The pre-recover scripts may also query Repository 280 to obtain the metadata that was stored by post-backup scripts. Such metadata may be used for restoring backup data.

Once the pre-recover scripts determines that Client 240 is not running any backup, Recover 276 may start. Upon completion of Recover 276, post-recover scripts may be executed in step 278. Post-recover scripts may query Repository 280 and the restored Application Database 295 for validation. The query of Repository 280 may obtain the attributes of the data before the restore. The query of the restored Application Database 295 may obtain the attributes of the data after the restore. In some embodiments, the validation may include comparing the pre-recover attributes with the post-recover attributes. A positive match of the two sets of attributes may indicate a successful validation. Upon a successful validation of the recover, Server Scheduler 230 may be restarted in step 220 and Data Simulation 290 may be restarted to resume test data generation. In some embodiments, post-restore scripts may also gather the recover results and send out notifications of the results.

FIG. 3 is a timing diagram illustrating a method to perform a backup according to a server schedule in an automated time-based testing of a distributed system, in accordance with some embodiments. The exemplary timing diagram according to Server Schedule 300 shows the interaction between Client 310 and Server 320. In some embodiments, Client 310 may include a set of backup scripts to perform the backup of data stored in Application Database 340. The set of backup scripts may include one or more Pre-Backup Scripts 330 and one or more Post-Backup Scripts 360. According to Server Schedule 300, when it is time to perform a backup testing, Pre-Backup Scripts 330 on Client 310 may be triggered in step 322 from Server 320.

Once Pre-Backup Scripts 330 is triggered, a check of recovery process running on Client 310 may be made in order to determine whether to start the backup process. In step 332, if any recovery process is detected running on Client 310, another check may be made after an interval. On the other hand, if no recovery process is running in the test environment of Client 310, in step 334, attributes such as the name, size, and/or content of the data for automated time-based testing may be obtained by querying Application Database 340. Once the attributes are obtained, in step 336, the attributes may be stored in Repository 350. Subsequently, test data may be backed up in step 338 to test the backup feature in the automated time-based testing.

Upon completion of the backup, in some embodiments, logs including the backup information may be generated, and Post-Backup Scripts 360 may be triggered in step 342. In Post-Backup Scripts 360, the backup metadata, such the type of the backup (i.e. incremental backup or full backup etc.), an identifier of the backup data as a backup reference, timestamps associated with the backup (i.e. backup savetime and backup completion time etc.), and the backup status among others, may be obtained from the logs and stored in Repository 350, denoted as step 362 in FIG. 3.

FIG. 4 is a timing diagram illustrating a method to perform a recover according to a client schedule in an automated time-based testing of a distributed system, in accordance with some embodiments. The exemplary timing diagram according to Client Schedule 400 shows the interaction between Client 410 and Server 460. In some embodiments, Client 410 may include a set of recover scripts to perform the recovery of data originally stored in Application Database 430. The set of recover scripts may include one or more Pre-Recover Scripts 420 and one or more Post-Recover Scripts 450. According to Client Schedule 400, when it is time to perform a recover testing, Pre-Recover Scripts 420 on Client 410 may be triggered in step 422 by a client scheduler.

In Pre-Recover Scripts 420, a server scheduler capable of triggering a backup process may first be stopped in step 424. In some embodiments, stopping the server scheduler on the remote Server 460 may be performed through Remote Procedure Call (RPC). Similar interprocess communication techniques may also be used. After the server scheduler is stopped, data simulation may also be stopped in step 426. A check of backup process may be made to determine whether to start the recovery process. In step 428, if any backup process is detected running on Client 410, another check may be made after an interval. On the other hand, if no backup process is running in the test environment of Client 410, in step 432 backup metadata may be obtained from Repository 440. Using the metadata, restore may be performed in step 434.

Upon completion of the restore, the restored database attributes may be compared with the pre-recover database attributes stored in Repository 440 to validate the restore in step 436. In some embodiments, a positive match may indicate a successful recover validation. Upon a successful recover validation, the server scheduler may be restarted in step 452 and data simulation may be restarted in step 454. In addition, the restore metadata, such as the restore status and timestamps associated the restore etc., may be sent out as notifications. The restore metadata may be used to analyze the performance impact of recover in order to determine load, scalability and reliability issues.

The automated time-based testing method for distributed systems described herein, in accordance with some embodiments, has several benefits. First, the modular collection of scripts allows a scalable the testing environment, especially in a distributed system. Many distributed system testing methods involve testing multiple features of a product deployed across the distributed system. During the testing, the coordination of timing and continuous monitoring of each feature testing may be challenging. As illustrated in FIG. 3 and FIG. 4, using a modular collection of scripts the present invention may run multiple independent workflows within the distributed system automatically according to pre-configured schedules. Each workflow may test one or more features of the product in the distributed system. Triggered by separate schedulers, the scripts monitor processes in different workflows and validate the status and the outputs to determine when to start the automated testing of a feature. The automated starting, stopping, and restarting of the scheduler as well as the coordination of multiple independent workflows allow the automated time-based testing method scalable to large distributed systems.

Second, the modular collection of scripts allows flexible configuration of real time and production system simulation for more thorough testing. As illustrated in FIG. 4, data simulation may be stopped in the pre-recover script. The stopping simulates a production system scenario where no or limited data operations may be performed when a database is crashed or corrupted and needs to be recovered. Similarly, during the recovery of the crashed or corrupted database, it is unnecessary to run backup processes in a production system. Thus, the configuration of scripts as illustrated in FIG. 4 closely resembles the real time and production system scenarios of not running a backup and a recover simultaneously when restoring a crashed or corrupted database.

Additionally or alternatively, the modular collection of scripts may be configured to simulate a modified real time and production system scenario of not running a backup and a recover simultaneously. For example, in a production system, a backup may be taken after a crashed or corrupted database is restored. During the backup, the production system may still have data operations performed. Though not illustrated in FIG. 3, in some embodiments, instead of stopping both the server scheduler and the data simulation in the pre-recover scripts, only the client scheduler may be stopped in the pre-backup scripts. Instead of restarting the server scheduler and the data simulation in the post-recover scripts, the post-backup scripts may restart the client scheduler. The modified configuration may closely resemble the production system scenario of not stopping the data operation during a backup process. The modified configuration may be used as an alternative simulation to a real time scenario of not running both a backup and a recover simultaneously. Thus, the modular collection of scripts allows flexible configuration of real time and production system simulation for more thorough testing.

Further, reliability and stability may be a major concern. An additional challenge is to validate the recovery at periodic intervals of the backup process. The method described herein allows automation of the continuous testing of both backup and recovery features without manual intervention. During the setup and configuration of the schedulers and the scripts, real time environment and scenarios may be simulated to allow rigorous testing without manual intervention. The outcome is less chance of regressions and supportability calls. Thus, the automated time-based testing method expands the robustness of distributed systems.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A computer-implemented method for testing multiple features of a software product across a plurality of hosts, comprising:
    a first computer process setting a backup schedule for a backup of a client using a server scheduler on a server;
    a second computer process setting a recover schedule using a client scheduler on the client, wherein the client includes a data simulation for generating simulated data and a repository, wherein the repository includes attributes of the simulated data and a metadata of the backup, wherein the simulated data comprises inputs and outputs of the multiple features;
    starting the data simulation on the client to generate the simulated data comprising simulated production environment data for automated testing of the backup, wherein timing of the inputs depends on at least one of timing or status of the outputs;
    according to the backup schedule, from the server, triggering a set of backup scripts to perform the backup of the simulated data generated by the data simulation; and
    according to the recover schedule, triggering a set of recover scripts to perform a recover of the simulated data on the client.

2. The method as recited in claim 1, wherein the data simulation continuously generates application data as the simulated data and stores the application data in an application database accessible to at least one of the first computer process and second computer process, and wherein application data generation by the data simulation may be stopped to simulate real time scenarios in production systems.

3. The method as recited in claim 1, wherein the metadata of the backup includes an identifier of the backup, a type of the backup, timestamps associated with the backup, and a status.

4. The method as recited in claim 1, wherein the set of backup scripts includes a pre-backup script and a post-backup script, and wherein triggering the set of recover scripts is performed prior to triggering the set of backup scripts.

5. The method as recited in claim 4, wherein triggering the set of backup scripts to perform the backup of the simulated data generated by the data simulation comprises:
   in the pre-backup script, determining if the client is running the recover;
      if the client is running the recover, waiting for a completion of the recover;
      if the client is not running the recover, obtaining the attributes of the simulated data, storing the attributes to the repository, and performing the backup of the simulated data generated by the data simulation;
   in the post-backup script, obtaining the metadata of the backup; and
   storing the metadata to the repository.

6. The method as recited in claim 5, further comprising:
   in the pre-backup script, stopping the client scheduler, wherein the stopping is performed prior to the determining; and
   in the post-backup script, restarting the client scheduler, wherein the restarting is performed after the storing.

7. The method as recited in claim 5, wherein the waiting comprises:
   polling the client after a first interval to determine if the client is running the recover; and
   if the client is running the recover, polling the client after a second interval.

8. The method as recited in claim 1, wherein the set of recover scripts includes a pre-recover script and a post-recover script.

9. The method as recited in claim 8, wherein triggering the set of recover scripts to recover the simulated data on the client according to the recover schedule comprises:
   in the pre-recover script, determining if the client is running the backup;
      if the client is running the backup, waiting for a completion of the backup;
      if the client is not running the backup, obtaining the metadata from the repository, and performing the restore of the simulated data on the client using the metadata;
   in the post-recover script, obtaining the attributes of the simulated data from the repository; and
   validating the simulated data using the attributes of the data stored in the repository and restore attributes obtained from querying the data to verify an expected correct response of the backup.

10. The method as recited in claim 9, further comprising:
    in the pre-recover script, stopping the server scheduler and the data simulation, wherein the stopping is performed prior to the determining; and
    in the post-recover script, restarting the server scheduler and the data simulation, wherein the restarting is performed after the validating.

11. The method as recited in claim 9, wherein the waiting comprises:
    polling the client after a first interval to determine if the client is running the backup; and
    if the client is running the backup, polling the client after a second interval.

12. The method as recited in claim 1, further comprising:
    sending out notifications of the backup and the recover.

13. A system for testing multiple features of a software product across a plurality of hosts, comprising: a processor configured to set a backup schedule for a backup of a client using a server scheduler on a server, set a recover schedule using a client scheduler on the client, wherein the client includes a data simulation for generating simulated data comprising simulated production environment data for automated testing of the backup and a repository, wherein the simulated data comprises inputs and outputs of the multiple features, wherein the repository includes attributes of the simulated data and a metadata of the backup, start the data simulation on the client, according to the backup schedule, wherein timing of the inputs depends on at least one of timing or status of the outputs, from the server, triggering a set of backup scripts to perform the backup of the simulated data generated by the data simulation, and according to the recover schedule, trigger a set of recover scripts to perform a recover of the simulated data on the client.

14. A computer program product for testing multiple features of a software product across a plurality of hosts, comprising a non-transitory computer usable medium having machine readable code embodied therein for:
    setting a backup schedule for a backup of a client using a server scheduler on a server;
    setting a recover schedule using a client scheduler on the client, wherein the client includes a data simulation for generating simulated data and a repository, wherein the repository includes attributes of the simulated data and a metadata of the backup, wherein the simulated data comprises inputs and outputs of the multiple features;
    starting the data simulation on the client, the simulated data comprising simulated production environment data for automated testing of the backup, wherein timing of the inputs depends on at least one of timing or status of the outputs;
    according to the backup schedule, from the server, triggering a set of backup scripts to perform the backup of the simulated data generated by the data simulation; and
    according to the recover schedule, triggering a set of recover scripts to perform a recover of the simulated data on the client.

15. The system of claim 13 wherein the data simulation continuously generates application data as the simulated data and stores the application data in an application database accessible to at least one first computer process and second computer process, and wherein application data generation by the data simulation may be stopped to simulate real time scenarios in production systems.

16. The method of claim 1 wherein the multiple features are tested consecutively through execution of one or more scripts in accordance with tasks scheduled by a scheduler.

17. The method of claim 1 wherein the scheduler comprises a server scheduler and a client scheduler independent of the server scheduler.

* * * * *